(12) United States Patent
Doerr et al.

(10) Patent No.: US 7,226,273 B2
(45) Date of Patent: *Jun. 5, 2007

(54) METHOD OF GENERATING COMPRESSED AIR, AND COMPRESSOR ARRANGEMENT FOR IMPLEMENTING THE METHOD

(75) Inventors: Wolfgang Doerr, Eichenau (DE); Eduard Gerum, Rosenheim (DE)

(73) Assignee: Knorr-Brense Systeme fuer Nutzfahrzeuge GmbH, Munich (DE)

( * ) Notice: Subject to any disclaimer, the term of this patent is extended or adjusted under 35 U.S.C. 154(b) by 575 days.

This patent is subject to a terminal disclaimer.

(21) Appl. No.: 10/653,450

(22) Filed: Sep. 3, 2003

(65) Prior Publication Data

US 2004/0151605 A1 Aug. 5, 2004

(30) Foreign Application Priority Data

Sep. 3, 2002  (DE)  .............................. 102 40 600

(51) Int. Cl.
    F04B 43/12   (2006.01)
    F04B 49/00   (2006.01)
    F04B 17/00   (2006.01)
    F04B 39/00   (2006.01)

(52) U.S. Cl. .................. 417/53; 417/212; 417/213; 417/251; 417/364

(58) Field of Classification Search ............... 417/212, 417/216, 280, 282, 286, 321, 572, 53, 251, 417/364
See application file for complete search history.

(56) References Cited

U.S. PATENT DOCUMENTS

| 2,380,226 | A | * | 7/1945 | Frantz ......................... 417/17 |
| 3,304,074 | A | * | 2/1967 | Atherton .................... 266/141 |
| 3,819,233 | A |   | 6/1974 | Barnard et al. |
| 4,696,165 | A | * | 9/1987 | Bucher ........................ 60/609 |
| 4,724,817 | A | * | 2/1988 | Cook .......................... 123/565 |
| 4,769,988 | A | * | 9/1988 | Clark, Jr. ..................... 60/370 |
| 5,426,932 | A | * | 6/1995 | Morihara et al. ........ 60/39.182 |

(Continued)

FOREIGN PATENT DOCUMENTS

DE          720 050         4/1942

(Continued)

OTHER PUBLICATIONS

Copy of European Search Report Dated Nov. 10, 2003 and translation of relevant portions thereof.

*Primary Examiner*—Ehud Gartenberg
*Assistant Examiner*—Ryan Gillan
(74) *Attorney, Agent, or Firm*—Crowell & Moring LLP

(57) ABSTRACT

Method and compressor arrangement for generating compressed air, particularly for commercial vehicles, which is generated by way of a compressor unit (3) driven by an internal-combustion engine (1) from the ambient air according to a control unit (14), in which cases, by means of the compressor unit (3) operated by the internal-combustion engine, compressed of only a low pressure level is generated for assigned low-pressure consuming devices (7a, 7b), and in that, starting from the compressed air of the low pressure level, by means of a separate auxiliary compressor unit (8), compressed air of a high pressure level is generated for assigned high-pressure consuming devices (11a, 11b), the coordinated triggering of the two compressor units (3,8) being carried out, in a pressure-demand-controlled manner, centrally by means of the control unit (14).

20 Claims, 1 Drawing Sheet

U.S. PATENT DOCUMENTS 6,829,893 B2 * 12/2004 Doerr et al. ................ 60/605.1

FOREIGN PATENT DOCUMENTS

| DE | 199 39 200 A1 | 12/2000 |
| DE | 100 03 869 A1 | 8/2001 |
| EP | 0 165 376 A2 | 12/1985 |
| EP | 0496 958 A1 | 8/1992 |
| WO | WO03/010436 | 2/2003 |

* cited by examiner

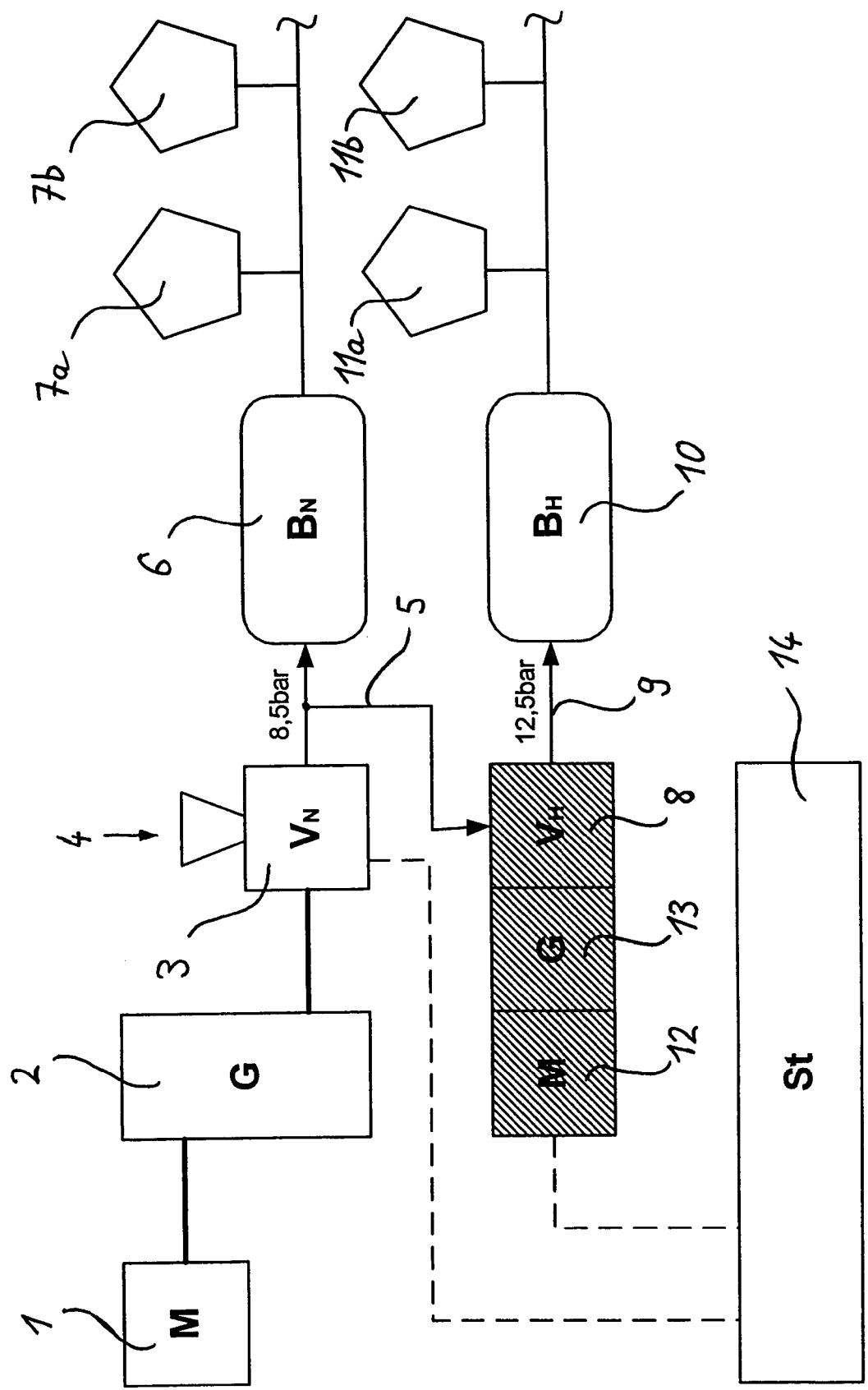

METHOD OF GENERATING COMPRESSED AIR, AND COMPRESSOR ARRANGEMENT FOR IMPLEMENTING THE METHOD

BACKGROUND AND SUMMARY OF THE INVENTION

The present invention relates to a method of generating compressed air, particularly for commercial vehicles. The compressed air is generated from ambient air by way of a compressor unit driven via an internal-combustion engine in accordance with a control unit. In addition, the invention relates to a compressor arrangement for implementing the method.

In the field of commercial vehicles, which is of special interest here, such methods and compressor arrangements, respectively, are used for carrying out the compressed-air procurement of the on-board pneumatic system of a commercial vehicle. The pneumatic system on board a commercial vehicle is required, in particular, for supplying the brake system, the pneumatic suspension, the trailer and diverse secondary consuming devices. The compressor arrangement of a commercial vehicle generates compressed air of up to 12.5 bar for this purpose.

The product information "High-Performance Compressors" of the firm KNORR-BREMSE Systeme für Nutzfahrzeuge GmbH (Printing No. P-3505-DE-01) discloses a compressor unit, which is constructed in the form of a piston compressor. A crankshaft rotatingly disposed in a compressor housing converts an input-side rotating movement, by means of the crankshaft drive principle, to a linear back and forth movement of an assigned piston housed in a cylinder. The piston, interacting with a valve device housed in the cylinder cover, takes in the ambient air and subsequently delivers it in a compressed state. The compressor unit is available in one-cylinder or two-cylinder designs. The one-cylinder design, at a maximum rpm of 3,000 revolutions per minute, has a delivery capacity of approximately 550 l/min. In contrast, the two-cylinder design is provided for pneumatic systems with a relatively high compressed-air consumption and, correspondingly, also has a higher delivery capacity; here, at a maximal rotational speed of 3,000 revolutions per minute, a delivery capacity of approximately 1,200 l/min.

The drive of the compressor unit takes place in a generally known manner by way of the internal-combustion engine of the commercial vehicle. In some application cases, a rotational-speed-transmitting transmission unit is connected between the internal-combustion engine and the compressor unit. In this case, the transmission unit of the compressor unit is usually integrated directly in the vehicle transmission of the commercial vehicle.

Such compressor arrangements of the prior art are, in addition, equipped with technical measures for saving energy. Thus, the operation of the above-described known compressor arrangement takes place by way of a control, which starts the operation of the compressor unit only when a compressed-air demand exists in the pneumatic system of the commercial vehicle. In most cases, the compressed-air demand is determined by way of a pressure sensor connected with the system pressure. If the system pressure falls below a defined threshold pressure, then the operation of the compressor unit is started, in order to again build up a sufficient air pressure. For storing the built-up pressure, in the case of the compressed-air system, normally one or more pressure reservoirs are used, which reservoirs have as large a volume as possible.

A demand control for the operation of the known compressor unit takes place by a switching of the compressor unit between a delivery phase and an idling phase. In the delivery phase, compressed air is generated from the ambient air and the pneumatic system is fed. In contrast, in the idling phase, the compressor unit runs without a load, so that, although a piston movement takes place, no compressed air reaches the pneumatic system. This compressed air will then be discharged to the outside. Since, because of the absent load, in the idling phase (in contrast to the delivery phase), much less power is consumed by the compressor unit, this type of air demand control contributes to the saving of energy.

However, it is disadvantageous that, in the delivery phase, the compressor unit has to work predominantly against a pressure of from 10 to 12.5 bar. Particularly, in the case of a one-stage compressor unit, this high counterpressure causes a high power consumption. In contrast, the compressed-air consuming devices of the pneumatic system require different amounts of operating pressure. Thus, for example, the operation of the brake system requires an air pressure of from 10 to 12 bar; the pneumatic suspension requires approximately 12 bar; and the trailer of a commercial vehicle operates with an air pressure of 8.5 bar. So far, these different operating pressures, starting from the maximal pressure of approximately 12.5 bar—generated by the compressor unit—were reduced by the control unit—for example, in the form of an APU (Air Processing Unit) or an EAC (Electronic Air Control). However, with respect to the energy required for operation, this method proves to be quite ineffective in practice.

It is therefore an object of the present invention to further improve a method, as well as a compressor arrangement, of the above-mentioned type such that a lower energy consumption is required for generating the compressed air.

With respect to the method, this object is achieved by a method of generating compressed air, particularly for commercial vehicles, which compressed air is generated from ambient air by way of a compressor unit driven by an internal-combustion engine according to a control unit. The compressor unit, operated by the internal-combustion engine, generates compressed air of only a low pressure level for assigned low-pressure consuming device. Starting from the compressed air of the low pressure level, via a separate auxiliary compressor unit, compressed air of a higher pressure level for assigned high-pressure consuming devices is generated. The coordinated triggering of the two compressor units is carried out, controlled by the pressure demand, centrally through the use of the control unit.

With respect to a compressor arrangement for implementing the method, the object is achieved by a compressor arrangement, particularly for commercial vehicles, having an internal-combustion engine for generating a rotating movement, which drives an output-side compressor unit for generating compressed air from the ambient air. The control unit triggers the compressed-air generation when compressed air is required. The compressor unit, operated by the internal-combustion engine, generates compressed air of only a low pressure level for assigned low-pressure consuming devices. Starting from the compressed air of this low pressure level, a separate auxiliary compressor unit generates compressed air of a higher pressure level for assigned high-pressure consuming devices. The control unit is provided for the coordinated, pressure-demand-controlled triggering of the two compressor units. Other advantageous further developments of the invention are described and claimed herein.

The invention includes the technical teaching that, by means of the combustion-engine-operated conventional compressor unit, only compressed air of a low pressure level is generated for assigned low-pressure consuming devices, whereas, based on this compressed air of the low pressure level, by means of a separate auxiliary compressor unit, compressed air of a higher pressure level for assigned high-pressure consuming devices is generated, in which case the coordinated triggering of both compressor units is carried out, controlled by the pressure demand, centrally through use of the control unit.

The advantages of the invention are achieved, in particular, from the fact that the conventional combustion-engine-operated compressor unit only still works against an air pressure of maximally 8.5 bar, whereby the compressor unit can be operated more effectively with a lower energy consumption. For the comparatively higher pressure level, which is required by the high-pressure consuming devices of the compressed-air system, a separate auxiliary compressor unit is used. This auxiliary compressor unit is completely separated from the internal-combustion-engine-operated compressor unit. With respect to the energy balance, the largest fraction of energy is still required by the compressor unit operated by the internal-combustion engine; but the higher pressure level is generated by the auxiliary compressor unit, which can be operated more effectively in this range. In comparison to the compressor unit operated by the internal-combustion engine, the separate auxiliary compressor unit of the higher pressure level needs to be operated only with a shorter switch-on duration in order to cover the occurring high-pressure requirement. On the whole, this results in a considerable savings of energy. For controlling the two compressor units in a coordinated manner, a joint control unit is provided. The joint control unit triggers the corresponding compressor unit in the case of a compressed-air demand in the low pressure level or a compressed-air demand in the higher pressure level.

According to a preferred embodiment, the compressed air of the low pressure level is stored in an assigned low-pressure reservoir, and the compressed air of the high pressure level is stored in an assigned high-pressure reservoir. In the high-pressure reservoir, also up to 20 bar—generated by the auxiliary compressor unit—can be stored so that, while the reservoir volume is the same, approximately twice the amount of energy can be stored. This maximal pressure level can be adapted corresponding to the operating pressure of the compressed-air consuming devices; that is, it can be reduced.

Furthermore, it is contemplated that the auxiliary compressor unit can be used for implementing an emergency function, which consists of covering the compressed-air demand at least temporarily by means of the auxiliary compressor unit in the event of the failure of the compressor unit operated by the internal-combustion engine. Correspondingly, the separate auxiliary compressor unit should not be driven by the internal-combustion engine of the commercial vehicle but, rather, by a redundant drive unit. A suitable drive unit is, for example, an electric motor which is provided with sufficient power by way of the electrical wiring of the commercial vehicle.

The control unit of the commercial vehicle used for triggering both compressor units controls the separate auxiliary compressor unit preferably indirectly by switching the input-side electric motor on and off. For the rotational speed adaptation, it is contemplated to arrange a suitable transmission between the electric motor and the auxiliary compressor unit. The auxiliary compressor unit, together with the electric motor and, optionally, with the transmission unit preferably forms a single system module. The single system module can be detachably mounted at the appropriate point on the commercial vehicle.

Other objects, advantages and novel features of the present invention will become apparent from the following detailed description of the invention when considered in conjunction with the accompanying drawings.

BRIEF DESCRIPTION OF THE DRAWING

The single FIGURE is a schematic block diagram of a compressor arrangement which is provided for implementing the method according to the invention.

DETAILED DESCRIPTION OF THE DRAWING

The compressor arrangement consists essentially of an internal-combustion engine 1 for generating a rotational movement, which is fed to a transmission unit 2 arranged on the output side in order to adapt the rotational speed of the internal-combustion engine 1 correspondingly to the permissible rotational speed for a compressor unit 3 situated on the output side of the transmission unit 2. To this extent, the transmission unit 2 operates as a reduction gear and is constructed in the manner of a spur gear. The compressor unit 3 provided on the output side of the transmission unit 2 utilizes the input-side rotating movement in a conventional manner for generating compressed air from ambient air 4. In this embodiment, the compressor unit 3 is constructed as a single-cylinder piston compressor known per se. The compressed air of 8.5 bar generated by the compressor unit 3 is fed on the output side by way of a compressed-air pipe 5 to a compressed-air reservoir 6. In this case, the compressed-air reservoir 6 is used for storing this compressed air having the low pressure level. Diverse low-pressure consuming devices 7a, 7b of the commercial vehicle are connected to the low pressure reservoir 6.

In addition, the compressed air at the low pressure level generated by the compressor unit 3 driven by the internal-combustion engine also arrives in an additional auxiliary compressor unit 8. The auxiliary compressor unit 8 compresses the compressed air to a higher pressure level of, here, 12.5 bar. On the output side of the auxiliary compressor unit 8, the compressed air of the high pressure level arrives at a high-pressure reservoir 10 by way of the compressed-air pipe 9. Diverse high-pressure consuming devices 11a, 11b, etc., are arranged at the high-pressure reservoir 10.

The auxiliary compressor unit 8 is provided only for generating the higher pressure level and is driven by an electric motor 12. Here, a transmission unit 13 is provided between the electric motor 12 and the auxiliary compressor unit 8. The motor 12 with the transmission unit 13 is preferably constructed as a geared motor type of component, which is flanged to the auxiliary compressor unit 8 in order to form a single system module.

For the coordinated controlling of the compressor unit 3 operated by the internal-combustion engine as well as of the auxiliary compressor unit 8, a control unit 14 is provided which, depending on the compressed-air demand, starts the operation of the compressor unit 3 driven by the internal-combustion engine and/or of the auxiliary compressor unit 8. Here, the start of the operation of the separate auxiliary compressor unit 8 takes place indirectly by switching the electric motor 12 situated on the input side on and off. In contrast, the compressor unit 3 operated by the internal-combustion engine, in this embodiment, can be switched in a conventional manner between an idling operation and a load operation, a permanent rotary drive taking place while the internal-combustion engine 1 is running. Furthermore, the control unit 14 implements an emergency function in which the electric-motor-driven auxiliary compressor unit 8, which is fed by the electric wiring of the commercial vehicle, is caused to operate in the event of a failure of the compressor unit 3 operated by the internal-combustion engine. This emergency function is maintained only temporarily in order to supply safety-relevant pressure consuming devices—such as brakes—with compressed air.

The invention is not limited to the above-described preferred embodiment. On the contrary, modifications of the latter are also conceivable which are included in the scope of protection of the following claims. Thus, it is, for example, contemplated that the auxiliary compressor device 8 is mounted locally separately from the compressor unit 3 operated by the internal-combustion engine, such as in the trailer of a commercial vehicle in order to generate a higher pressure level there for assigned local high-pressure consuming devices. This results in additional advantages, as a reduction in size of brake components, pressure reservoirs, air spring bellows for the pneumatic suspension and the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

TABLE OF REFERENCE NUMBERS

1 Internal-combustion engine
2 transmission unit
3 compressor unit
4 ambient air
5 compressed-air pipe
6 low-pressure reservoir
7 low-pressure consuming device
8 auxiliary compressor unit
9 compressed-air pipe
10 high-pressure reservoir
11 high-pressure consuming device
12 electric motor
13 transmission unit
14 control unit

What is claimed is:

1. A method of generating compressed air for commercial vehicles, which compressed air is generated from ambient air by way of a compressor unit driven by an internal-combustion engine according to a control unit, the method comprising the acts of:
   generating compressed air of only a low pressure level for assigned low-pressure consuming devices by using the compressor unit operated by the internal-combustion engine;
   starting from the compressed air of the low pressure level, generating compressed air of a higher pressure level for assigned high-pressure consuming devices by using a separate auxiliary compressor unit; and
   centrally controlling via the control unit a coordinated triggering of the compressor unit and auxiliary compressor unit based on the pressure demand.

2. The method according to claim 1, further comprising the act of:
   storing the compressed air of the low pressure level in an assigned low-pressure reservoir, and the compressed air of the high pressure level in an assigned high-pressure reservoir.

3. The method according to claim 1, further comprising the act of:
   in an event of a failure of the compressor unit operated by the internal-combustion engine, at least temporarily covering a compressed-air requirement to an extent of an emergency function by using the auxiliary compressor unit.

4. The method according to claim 3, further comprising the act of:
   in an event of a failure of the compressor unit operated by the internal-combustion engine, at least temporarily covering a compressed-air requirement to an extent of an emergency function by using the auxiliary compressor unit.

5. The method according to claim 1, wherein the separate auxiliary compressor unit is driven electrically.

6. The method according to claim 2, wherein the separate auxiliary compressor unit is driven electrically.

7. The method according to claim 3, wherein the separate auxiliary compressor unit is driven electrically.

8. Compressor arrangement for commercial vehicles having an internal-combustion engine, comprising:
   a compressor unit for generating compressed air from ambient air, the compressor unit being driven by the internal-combustion engine;
   a control unit triggering compressed-air generation when compressed air is required;
   wherein the compressor unit generates compressed air of only a low pressure level for assigned low-pressure consuming devices; and
   a separate auxiliary compressor unit, wherein starting from the compressed air of the low pressure level, the separate auxiliary compressor unit generates compressed air of a higher pressure level for assigned high-pressure consuming devices;
   and further wherein the control unit coordinates a pressure-demand-controlled triggering of the compressor unit and separate auxiliary compressor unit.

9. Compressor arrangement according to claim 8, wherein compressed air of the low pressure level is stored by an assigned low-pressure reservoir, and the compressed air of the high pressure level is stored in an assigned high-pressure reservoir.

10. Compressor arrangement according to claim 8, wherein, in an event of a failure of the compressor unit operated by the internal-combustion engine, the auxiliary compressor unit meets the compressed-air demand at least partially to the extent of an emergency function according to the control unit.

11. Compressor arrangement according to claim 9, wherein, in an event of a failure of the compressor unit operated by the internal-combustion engine, the auxiliary compressor unit meets the compressed-air demand at least partially to the extent of an emergency function according to the control unit.

12. Compressor arrangement according to claim 8, wherein the control unit triggers the separate auxiliary compressor unit indirectly by switching an electric motor situated on an input side of the separate auxiliary compressor unit on and off.

13. Compressor arrangement according to claim 9, wherein the control unit triggers the separate auxiliary compressor unit indirectly by switching an electric motor situated on an input side of the separate auxiliary compressor unit on and off.

14. Compressor arrangement according to claim 10, wherein the control unit triggers the separate auxiliary compressor unit indirectly by switching an electric motor situated on an input side of the separate auxiliary compressor unit on and off.

15. Compressor arrangement according to claim 12, wherein the electric-motor-driven auxiliary compressor unit is a single-stage compressor unit.

16. Compressor arrangement according to claim 8, wherein the compressor unit operated by the internal-combustion engine is a one- or two-stage compressor unit.

17. A method of generating compressed air for a commercial vehicle having low-pressure and high-pressure consuming devices, the method comprising the acts of:
   operating a first compressor unit drivable by an internal-combustion engine of the vehicle to generate only low pressure compressed air assignable to the low-pressure consuming devices;
   operating a separate auxiliary compressor unit to compress the low pressure compressed air into a high pressure compressed air assignable to the high-pressure consuming devices; and
   coordinating a pressure-demand-controlled triggering of the first and second compressor units via a control unit.

18. The method according to claim 17, further comprising the act of storing the low pressure compressed air in an assigned low-pressure reservoir, and storing the high pressure compressed air in a further assigned high-pressure reservoir.

19. A compressor arrangement for a commercial vehicle having an internal-combustion engine, comprising:
   a first compressor unit drivable by the internal-combustion engine for generating only low pressure compressed air from ambient air, the low pressure compressed air being assignable to low pressure consuming devices in the vehicle;
   a second, separate, auxiliary compressor unit generating high pressure compressed air from the low pressure compressed air, the high pressure compressed air being assignable to high-pressure consuming devices in the vehicle; and
   a control unit coupled to the first and second compressor units for coordinating a pressure-demand-controlled triggering of the first and second compressor units.

20. The compressor arrangement according to the claim 19, further comprising:
   an assigned low-pressure reservoir for storing the low pressure compressed air; and
   an assigned high-pressure reservoir for storing the high-pressure compressed air.

* * * * *